R. J. BERRYMAN.
METHOD OF MANUFACTURING AND HARVESTING ICE.
APPLICATION FILED APR. 22, 1909.
936,979.
Patented Oct. 12, 1909.
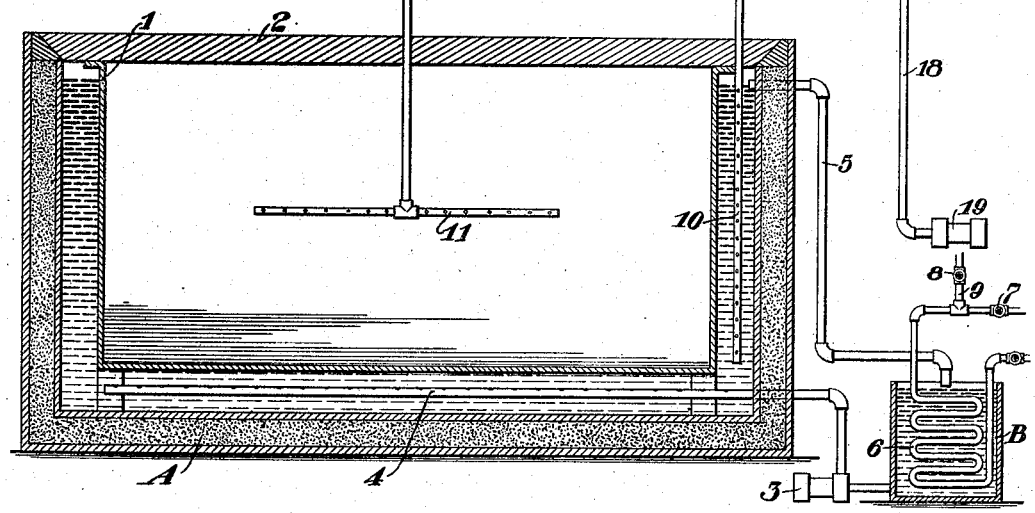
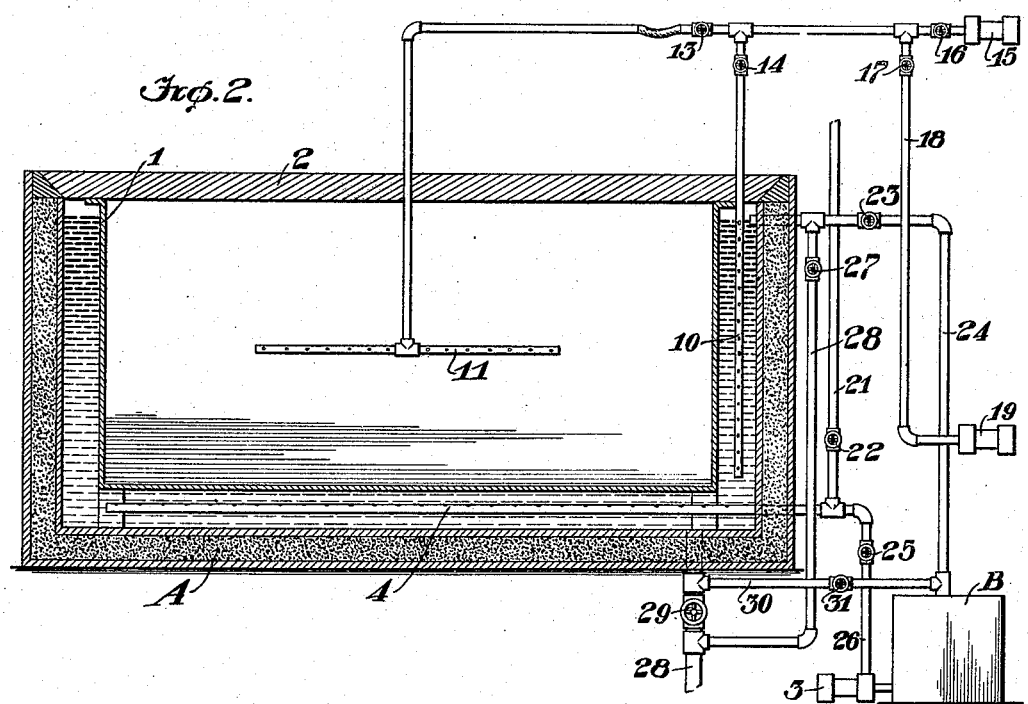

UNITED STATES PATENT OFFICE.

ROBERT J. BERRYMAN, OF ANNAPOLIS, MARYLAND, ASSIGNOR OF ONE-HALF TO MARIANNA BUDD BERRYMAN, OF ANNAPOLIS, MARYLAND.

METHOD OF MANUFACTURING AND HARVESTING ICE.

936,979.      Specification of Letters Patent.      Patented Oct. 12, 1909.

Application filed April 22, 1909. Serial No. 491,487.

*To all whom it may concern:*

Be it known that I, ROBERT J. BERRYMAN, a citizen of the United States, residing at Annapolis, in the county of Anne Arundel and State of Maryland, have invented certain new and useful Improvements in Methods of Manufacturing and Harvesting Ice, of which the following is a specification.

My invention relates to an improvement in the method of manufacturing and harvesting ice, and the process consists in submerging a measured quantity of water to be frozen in liquid contained in an outer tank and in discharging a refrigerant approximately throughout the length of said submerging liquid in close proximity to the container for the water, whereby to introduce it in as close contact as possible with the bottom and ends of the container in order to utilize it in the best manner to facilitate the freezing process, and subsequently, when it comes to harvesting the ice, my process contemplates discharging a thawing medium in similar manner in proximity to the container in which the ice has been formed.

In the accompanying drawings:—Figure 1 is a sectional view illustrating the process, and Fig. 2 is an illustration of a slight variation in the mode of introducing and disposing of the thawing medium, it being to all intents and purposes the same as is the process illustrated in Fig. 1.

A, represents an outer tank; 1, represents one of a series of sheet metal cans therein. The tank is insulated in the customary manner, and a cover 2 is adapted to be placed over it, as shown in Fig. 1.

B, is a brine cooler from which the brine is forced by means of a pump 3, into the tank, the brine discharging through a perforated pipe 4 which extends approximately throughout the length of the tank and preferably lies just beneath the longitudinal center of each can where it is adapted to discharge the brine or other freezing medium in close proximity to the can bottom, whence it rises on all sides of the can to the surface. Here an overflow pipe 5 returns the freezing medium to the cooler B, so that it may be re-circulated. Ammonia gas introduced through a coil 6 whereby it is circulated through the brine or other freezing medium, maintains its temperature below freezing point. When the thawing takes place, the valve 7 in the ammonia pipe is closed, and valve 8 in the hot gas pipe 9 is opened, thus substituting for the cold ammonia gas, hot gas whereby to heat the contents of the cooler B, whereupon the pump circulates the hot liquid in place of the freezing liquid until the ice is thawed from the walls of the container or containers.

While the freezing is taking place, an agitation of the water to be frozen as well as the freezing medium is going on by means of the perforated discharge pipe 10 in the container, and the pipe 11 in the tank, the valves 13 and 14 being open for this purpose, and an air pump 15 being provided for supplying the air when the valve 16 is open. These same agitating pipes may be utilized to withdraw the water from the center of the ice, and from the tank, if desired, and in order to do this, the air pump 15 is stopped, the valve 16 is closed, and the valve 17 in pipe 18 is opened, whereby the suction pump 19 is started, and the water is pumped out or withdrawn.

The slightest deviation from the foregoing, illustrated in Fig. 2, simply consists in taking the thawing medium from an independent source, as for instance, the waste water from the ammonia condenser through a pipe 21 controlled by valve 22, and when the thawing medium is circulating, the valve 23 in return pipe 24, and valve 25 in pipe 26, are shut, and the valve 27 in pipe 28 is opened, thus permitting the thawing medium to overflow at the top into the drain pipe 28 to the sewer, valves 29 and 31, of course, being closed. When it is desired to entirely remove the thawing medium from the tank, it is drained from the bottom through drain pipe 28 by opening valve 29, and as a preliminary to introducing the thawing medium in order to save all of the brine or freezing medium, it is first removed through the bottom of the tank through pipe 30, after first having opened valve 31 and closed valve 29. In this way, any waste of the brine or freezing medium is prevented, and the thawing medium is supplied and from any source, it all being controlled by proper manipulation of the several valves 23, 25, 27, 29, and 31.

By reason of the location of the perforated pipes as previously mentioned, during the freezing process, the cold brine in turn is discharged almost directly in contact with the bottom of the cans whence it naturally and necessarily rises along the sides and ends of the can or cans to the top, thus tending to cause the plates of ice formed to freeze a uniform thickness by reason of the agitation and circulation and propinquity incident to this arrangement. The same applies also with the thawing medium, thus facilitating and hastening the thawing of the ice away from the cans.

Having fully described my invention, what I claim as new and desire to secure by Letters Patent, is:—

1. The herein-described process of manufacturing ice which consists in inclosing the water to be frozen in a receptacle, discharging a freezing medium directly in contact with the bottom of said receptacle throughout the entire length of the latter, and causing such freezing medium thence to rise along the sides of the receptacle.

2. The herein-described process of manufacturing ice which consists in inclosing the water to be frozen in a receptacle, discharging a freezing medium directly against the bottom of the water-containing receptacle, and causing such freezing medium to ascend along the sides of the receptacle, and subsequently circulating a thawing medium in the same manner as the freezing medium so as to loosen the ice from the receptacle.

3. The herein-described process of manufacturing ice which consists in cooling a heat-transferring liquid by means of an easily expanded volatile refrigerant, circulating such freezing liquid around the vessel containing the water to be frozen, and subsequently heating such heat-transferring liquid by means of the volatile refrigerant in the hot and compressed condition, and circulating the liquid around the vessel in order to loosen the ice.

In testimony whereof I affix my signature, in the presence of two witnesses.

ROBERT J. BERRYMAN.

Witnesses:
C. A. NEALE,
VERNON E. HODGES.